(12) United States Patent
Jeong et al.

(10) Patent No.: US 9,386,484 B2
(45) Date of Patent: Jul. 5, 2016

(54) METHOD AND APPARATUS FOR SELECTING CELL IN MOBILE COMMUNICATION NETWORK

(71) Applicant: Samsung Electronics Co., Ltd., Gyeonggi-do (KR)

(72) Inventors: Sangsoo Jeong, Gyeonggi-do (KR); Songyean Cho, Seoul (KR); Hyejeong Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/283,987

(22) Filed: May 21, 2014

(65) Prior Publication Data
US 2014/0348064 A1 Nov. 27, 2014

(30) Foreign Application Priority Data

May 21, 2013 (KR) .......................... 10-2013-0057128
Jun. 25, 2013 (KR) .......................... 10-2013-0073272

(51) Int. Cl.
| | | |
|---|---|---|
| *H04L 12/66* | (2006.01) | |
| *H04W 36/00* | (2009.01) | |
| *H04W 48/20* | (2009.01) | |
| *H04W 48/18* | (2009.01) | |

(52) U.S. Cl.
CPC .......... *H04W 36/0022* (2013.01); *H04W 48/18* (2013.01); *H04W 48/20* (2013.01)

(58) Field of Classification Search
CPC ......... H04L 65/00; H04L 45/00; H04L 45/02; H04L 45/04; H04L 2012/64; H04L 12/64; H04L 65/102; H04L 29/06176; H04L 12/6418
USPC .............. 370/351–357, 310.2, 328, 338, 331, 370/389, 349
See application file for complete search history.

(56) References Cited

U.S. PATENT DOCUMENTS

| | | |
|---|---|---|
| 8,369,253 B2 | 2/2013 | Faccin et al. |
| 2009/0238143 A1 | 9/2009 | Mukherjee et al. |
| 2011/0103277 A1 | 5/2011 | Watfa et al. |
| 2011/0141910 A1 | 6/2011 | Rosik |
| 2011/0194505 A1* | 8/2011 | Faccin et al. .................. 370/329 |
| 2011/0207458 A1* | 8/2011 | Tanaka et al. .............. 455/435.1 |
| 2011/0249624 A1* | 10/2011 | Ramachandran et al. .... 370/328 |
| 2012/0115489 A1* | 5/2012 | Shuai et al. .................... 455/438 |
| 2012/0300750 A1 | 11/2012 | Chin et al. |
| 2012/0322448 A1 | 12/2012 | Chin et al. |
| 2013/0265954 A1* | 10/2013 | Dahlen et al. ................. 370/329 |
| 2014/0235242 A1 | 8/2014 | Granzow et al. |

(Continued)

FOREIGN PATENT DOCUMENTS

| | | |
|---|---|---|
| KR | 1020100060353 | 6/2010 |
| WO | WO 2010/024111 | 3/2010 |
| WO | WO 2011/020002 | 2/2011 |
| WO | WO 2011/100252 | 8/2011 |

(Continued)

*Primary Examiner* — Brenda H Pham
(74) *Attorney, Agent, or Firm* — The Farrell Law Firm, P.C.

(57) ABSTRACT

Methods and apparatuses are provided for selecting a cell in a mobile communication network for a network access of a terminal and a position update. A method includes receiving a first message from a network; determining whether a cell, which the terminal accesses, supports Circuit Switched Fall-Back (CSFB), based on the first message; and determining whether to select the cell, based on whether the cell supports the CSFB.

14 Claims, 10 Drawing Sheets

(56) References Cited

U.S. PATENT DOCUMENTS

2014/0314046 A1 10/2014 Jung et al.
2014/0349662 A1* 11/2014 Ekici et al. .................... 455/450

FOREIGN PATENT DOCUMENTS

| WO | WO 2012/135994 | 10/2012 |
| WO | WO 2013/066060 | 5/2013 |

* cited by examiner

METHOD AND APPARATUS FOR SELECTING CELL IN MOBILE COMMUNICATION NETWORK

PRIORITY

This application claims priority under 35 U.S.C. §119(a) to Korean Patent Application Serial Nos. 10-2013-0057128 and 10-2013-0073272 which were filed in the Korean Intellectual Property Office on May 21, 2013 and Jun. 25, 2013, respectively, the content of each of which is incorporated herein by reference.

BACKGROUND OF THE INVENTION

1. Field of the Invention

The present invention relates generally to a method and an apparatus for selecting a cell in a mobile communication network, and more particularly, to a method of selecting a cell in order to access a network or update a position.

2. Description of the Prior Art

In current module communication systems, 2nd generation systems and 3rd generation systems are mainly used, and Long Term Evolution (LTE), which corresponds to a $4^{th}$ generation system, is currently being standardized.

Basically, an LTE system supports only a service in a Packet Switched (PS) scheme. Accordingly, in order to provide a voice call to a user, the LTE standard proposes a Circuit Switch (CS) FallBack (FB) service.

FIG. 1 illustrates a conventional CSFB service. As illustrated in FIG. 1, when a voice call is generated for a terminal camping in an LTE system, the CSFB service refers to a service of handing over the mobile terminal to a conventional 2G/3G legacy system to connect the voice call.

While some LTE cells support a CSFB function, some LTE cells do not support the CSFB function, depending on a service provider network situation.

When an LTE terminal is located within an LTE cell that does not support the CSFB, if the LTE terminal is a single radio LTE terminal, then the terminal may use only the 2G/3G legacy system, without using LTE at all, but if the LTE terminal is a dual radio LTE terminal, the terminal may receive a PS service using LTE and a voice service using 2G/3G.

When the single radio LTE terminal uses only the legacy system, without using LTE, in the cell, which does not support the CSFB service, and then moves to the cell that supports the CSFB service, the signal radio LTE terminal may not use LTE.

SUMMARY OF THE INVENTION

The present invention is designed to address at least the problems and/or disadvantages described above and to provide at least the advantages described below.

Accordingly, an aspect of the present invention is to allow a single radio LTE terminal to receive a PS service and a CS service, when an LTE cell that supports CSFB and an LTE cell that does not support CSFB overlap a 2G/3G legacy network.

In accordance with an aspect of the present invention, a method of cell selection by a terminal in a mobile communication system is provided. The method includes receiving a first message from a network; determining whether a cell, which the terminal accesses, supports Circuit Switched FallBack (CSFB), based on the first message; and determining whether to select the cell, based on whether the cell supports the CSFB.

In accordance with another aspect of the present invention, a method of supporting cell selection for a terminal by an evolved-Node B (eNB) in a mobile communication system is provided. The method includes determining whether a cell corresponding to the eNB, which the terminal accesses, supports Circuit Switched FallBack (CSFB); generating a first message including information indicating whether the cell corresponding to the eNB, which the terminal accesses, supports the CSFB; and transmitting the first message to the terminal.

In accordance with another aspect of the present invention, a method of supporting cell selection for a terminal by a Mobility Management Entity (MME) in a mobile communication system is provided. The method includes receiving a first message from the terminal; determining whether the terminal needs to perform Circuit Switched FallBack (CSFB) and whether a network corresponding to the MME supports the CSFB; and if the terminal needs to perform the CSFB, transmitting a second message including information indicating whether a cell of the network corresponding to the MME supports the CSFB to the terminal.

In accordance with another aspect of the present invention, a terminal for performing cell selection in a mobile communication system is provided. The terminal includes a transceiver configured to transmit and to receive information to and from a network; and a controller configured to control the transceiver for receiving a first message from the network, to determine whether a cell, which the terminal accesses, supports Circuit Switched FallBack (CSFB), based on the first message, and to determine whether to select the cell, based on whether the cell supports the CSFB.

In accordance with another aspect of the present invention, an evolved-Node B (eNB) for supporting cell selection for a terminal in a mobile communication system is provided. The eNB includes a transceiver configured to transmit and receive information to and from the terminal; and a controller configured to determine whether a cell corresponding to the eNB, which the terminal accesses, supports Circuit Switched FallBack (CSFB), to generate a first message including information indicating whether the cell corresponding to the eNB, which the terminal accesses, supports the CSFB, and to control the transceiver for transmitting the first message to the terminal.

In accordance with another aspect of the present invention, a Mobility Management Entity (MME) for supporting cell selection for a terminal in a mobile communication system is provided. The MME includes a transceiver configured to transmit and receive information to and from the terminal; and a controller configured to control the transceiver for receiving a first message from the terminal and transmitting a second message to the terminal, if the terminal needs to perform Circuit Switched FallBack (CSFB), and to determine whether the terminal needs to perform the CSFB and whether a network corresponding to the MME supports the CSFB. The second message includes information indicating whether a cell of the network corresponding to the MME supports the CSFB.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE INVENTION

Figure 1:
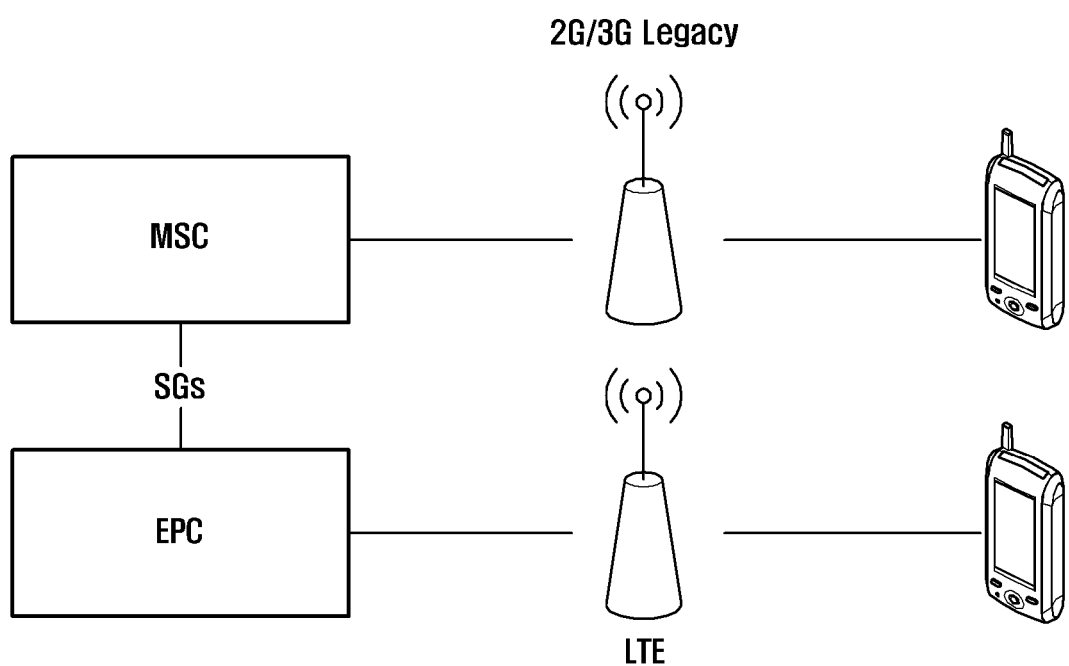
FIG. 1 illustrates a conventional CSFB service.

Hereinafter, various embodiments of the present disclosure will be described with reference to the accompanying drawings. It is noted that, where possible, the same reference numerals are designated to the same components in the accompanying drawings. Further, a detailed description of a known function and configuration which may make the subject matter of the present invention unclear will be omitted.

Further, the detailed description of embodiments of the present invention is made mainly based on a wireless communication system based on Orthogonal Frequency-Division Multiplexing (OFDM), particularly, the 3rd Generation Partnership Project Evolved Universal Terrestrial Radio Access (3GPP EUTRA) standard, but the subject matter of the present invention can be applied to other communication systems having similar technical backgrounds and channel forms, by those of ordinary skill in the art, after a little modification, without departing from the scope of the present invention.

Further, in the various embodiments of the present invention described in the specification and drawings, it may be assumed that a network cannot support an IP Multimedia System (IMS) voice over PS session (hereinafter, referred to as Voice over LTE (VoLTE)). That is, in the embodiments of the present invention described herein, it is assumed that information indicating the supporting of VoLTE is not included in a message that a user terminal receives from a network.

Some network service providers of a mobile communication system install a 2G/3G legacy network and an LTE network to overlap each other when configuring the network. Accordingly, some LTE networks may support CSFB but some may not.

Figure 2:
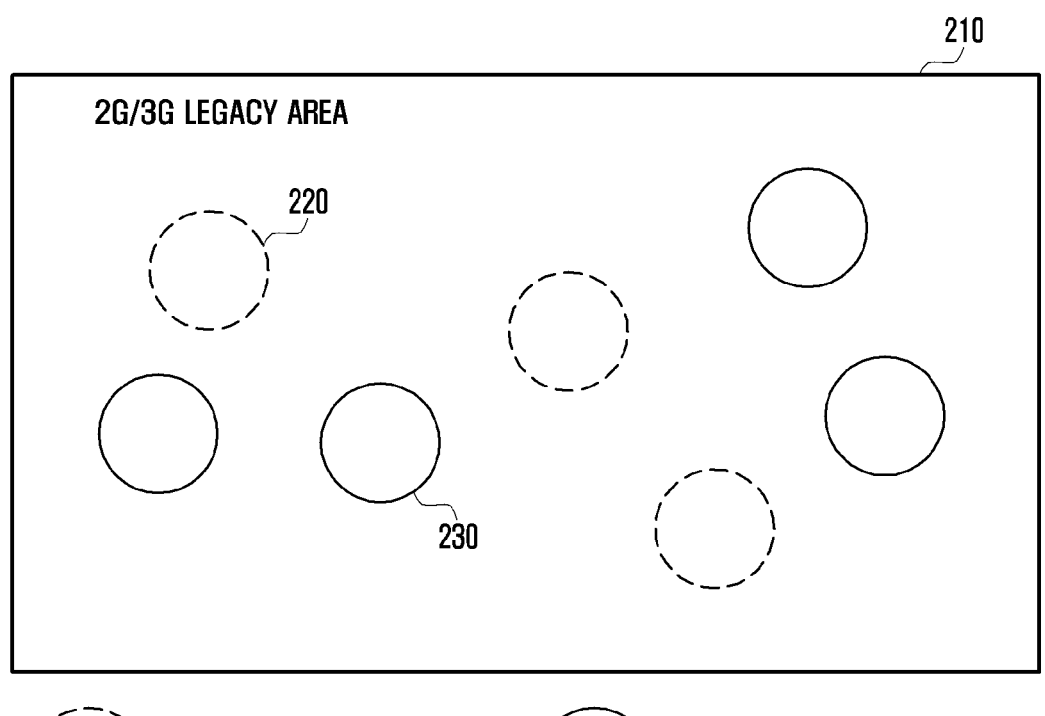
FIG. 2 illustrates LTE areas overlapping legacy areas to which the present invention is applied.

FIG. 2 illustrates LTE areas overlapping a legacy area to which the present invention is applied.

Referring to FIG. 2, a plurality of LTE areas 220 and 230 overlap a 2G/3G legacy area 210. Further, the LTE areas 220 do not support CSFB and the LTE areas 230 may support CSFB.

When a single radio CSFB using LTE terminal performs a combined attached process or a combined Tracking Area Update (TAU) process in an LTE area 220, in which CSFB is not possible, an MME informs the terminal that CSFB is impossible in the corresponding area and a voice centric terminal is then required to receive a service from a 2G/3G legacy network, instead of LTE, to properly receive a voice service.

In order to prevent the terminal from unnecessarily camping in the LTE cell again, the user terminal disables the LTE function. The disabled LTE function is turned on only when a PLMN is changed or the terminal is turned off and then turned back on. This conventionally prevents a user from later using LTE, even when the user moves to an LTE area 230 supporting CSFB.

In order to solve the above problem, in accordance with an embodiment of the present invention, a terminal is provided that can receive PS and CS services without stopping the LTE function. Specifically, according to an embodiment of the present invention, a network may provide a terminal with identification information indicating whether a cell to which the terminal desires to transmit a combined attach or combined TAU request supports CSFB. Thereafter, the terminal may determine whether to select/reselect the corresponding cell according to whether the cell supports CSFB, based on the identification information.

According to another embodiment of the present invention, a network may provide a terminal with an identifier indicating whether an LTE cell supports CSFB. When the terminal identifies that the LTE cell does not support CSFB based on the identifier, the network may then prevent the LTE cell from being selected, by giving a lower priority to LTE over 2G/3G (as priority is generally configured for each frequency).

In a 2G/3G cell, the network may give a higher priority to LTE of the terminal connected to the network in order to urge the LTE cell to be selected. The configured priority may be applied during a particular time (for example, t320). When the terminal directly controls the priority based on LTE cell information, t320 may be configured as a proper value (for example, to be long enough). Similarly, when an evolved-Node B (eNB) configures LTE/2G/3G priorities of the terminal, t320 may be configured as a proper value and transmitted to the terminal, so that the terminal can use a timer.

An implementation form of the identification information may vary depending on an embodiment of the present invention. Hereinafter, various forms of identification information indicating whether a cell supports CSFB will be described in detail. However, the following embodiments are merely provided as examples, and the embodiments of the present invention described below are not limited thereto.

In accordance with an embodiment of the present invention, a method is provided, which uses different PLMN IDs in a cell included in an LTE area supporting CSFB and a cell included in an LTE area that does not support CSFB. For example, the CSFB supporting is determined through the PLMN ID by using PLMN1 in an LTE cell that does not support the CSFB service, such as an area indicated by reference numeral 220 in FIG. 2 and using PLMN2 in an LTE cell that supports the CSFB service, such as an area indicated by reference numeral 230 in FIG. 2. Accordingly, a terminal may identify a PLMN ID received from a particular cell to determine whether the corresponding cell supports the CSFB service.

The user terminal may have a list including PLMN IDs of cells that support the CSFB service and can use LTE or PLMN IDs of cells that do not support the CSFB service, and thus, cannot use LTE. The list of the PLMN IDs may be configured in the user terminal through an Open Mobile Alliance (OMA) Device Management (DM) scheme or pre-configured in the user terminal when the terminal is manufactured. For example, the PLMN IDs of LTE cells that do not support the CSFB service may be configured as a "forbidden PLMN list for LTE".

The user terminal may determine whether a particular LTE cell can be used, based on a PLMN ID list stored in the terminal when selecting a suitable cell to stay in an idle mode for the combined attach or TAU process.

As described above, because the cell included in the LTE area that supports CSFB and the LTE cell that does not support CSFB may be configured to use different PLMN IDs, if the user terminal determines a PLMN ID received from the LTE cell as a PLMN ID that can use LTE, the user terminal may use LTE by selecting the corresponding cell or receive the CSFB service. When the user terminal determines the PLMN ID received from the LTE cell as a PLMN ID that cannot use LTE, because CSFB is not supported, the user terminal may neither select the corresponding cell nor disable the LTE function.

Figure 3:
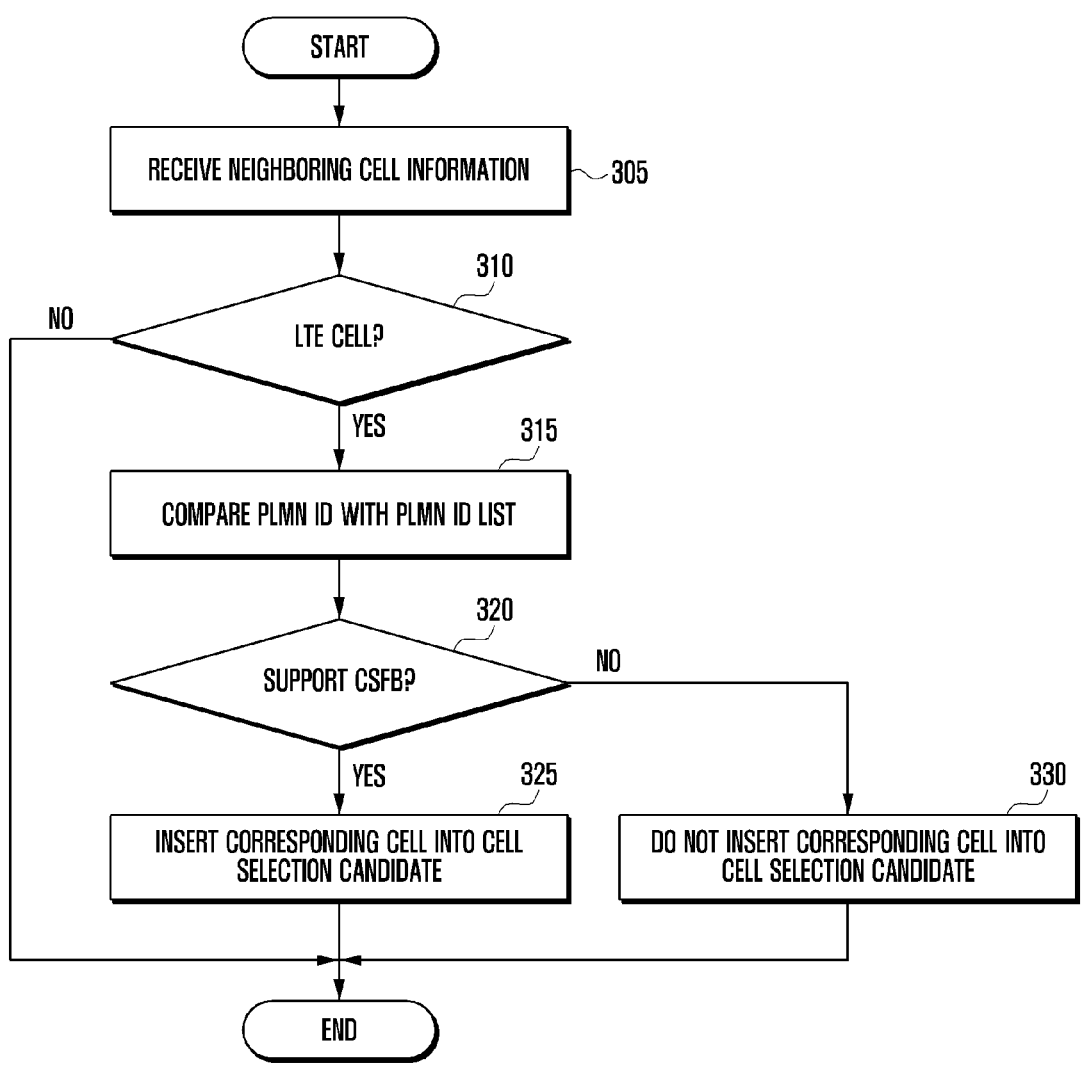
FIG. 3 is a flowchart illustrating an operation of a user terminal that determines whether a cell supports CSFB based on a Public Land Mobile Network (PLMN) IDentifier (ID) according to an embodiment of the present invention.

FIG. 3 is a flowchart illustrating an operation of a user terminal that determines whether a cell supports CSFB based on a PLMN ID according to an embodiment of the present invention.

Referring to FIG. 3, the user terminal receives neighboring cell information, for example, a System Information Block (SIB) through a receiver in step 305. In step 310, a controller of the terminal determines whether the corresponding cell is an LTE cell based on the received cell information. When the cell is the LTE cell, the controller compares a PLMN ID (or PLMN IDs) of the cell information received through the receiver with a list of the configured PLMN IDs in step 315. During such a process, the controller may determine whether both an LTE service and a CS service can be received using the corresponding LTE cell in step 320.

When the controller determines that the corresponding cell can be used, the controller considers that the corresponding cell can be selected/reselected in step 325. When the controller determines that the CS service will have a problem because the LTE cell does not support CSFB, the controller does not consider the selection/reselection of the corresponding cell in step 330.

In FIG. 3, whether CSFB service is supported is identified using the PLMN ID, and accordingly, the user terminal determines whether the LTE cell can be selected/reselected.

According to another embodiment of the present invention, the terminal may determine whether the CSFB service is supported using the PLMN ID transmitted by the LTE cell and the PLMN ID (list) configured in the terminal. When the CSFB service is not supported in the corresponding area, the terminal may prevent the LTE cell from being selected, by locally giving a lower selection/reselection priority to the 2G/3G cell over the LTE cell. The selection/reselection priority may be generally configured through a reselection priority for each carrier frequency within IdleModeMobilityControlInfo of an RRCConnectionRelease message.

In the 2G/3G cell, the network may give a higher priority to LTE of the terminal connected to the network in order to urge the LTE cell to be selected. That is, the terminal selects the 2G/3G cell according to the configured priority in the LTE cell to access the network and then the access is released, a 2G/3G eNB may give a higher selection/reselection priority to the LTE cell over the 2G/3G cell through IdleModeMobilityControlInfo or similar information, thereby inducing the use of LTE rather than 2G/3G in the LTE cell supporting the CSFB service.

In accordance with another embodiment of the present invention, different TAIs are used in an LTE area supporting CSFB and an LTE area that does not support CSFB. Using different TAIs may include a case where Tracking Area Codes (TACs), which are a part of the TAI, are different. Similar to using PLMN IDs, the support of CSFB is determined using the TAI by using TAU in an LTE cell that does not support the CSFB service, such as an area indicated by reference numeral 220 in FIG. 2, and using TAI2 in a LTE cell that supports the CSFB service, such as an area indicated by reference numeral 230 in FIG. 2. Accordingly, the terminal may identify a TAI received from a particular cell in order to determine whether the corresponding cell supports the CSFB service.

The user terminal may have a list of TAIs that can use CSFB and LTE, and TAIs that do not support CSFB, and thus, cannot use LTE. The list of the TAIs may be configured in the user terminal through an OMA-DM scheme or pre-configured in the user terminal when the terminal is manufactured. For example, the TAIs of LTE cells that do not support the CSFB service may be configured as a "forbidden TAI list for LTE".

As described above, because the cell included in the LTE area supporting CSFB and the LTE cell that does not support CSFB may be configured to use different TAIs, a user terminal may determine whether the user terminal can use LTE while using CSFB in a particular cell based on a TAI list pre-configured in a process of selecting a suitable cell. When the user terminal determines the TAI received from the LTE cell as a TAI that can use LTE, because CSFB is supported, the user terminal may select the corresponding cell to use LTE or receive the CSFB service. When the user terminal determines the TAI received from the LTE cell as a TAI that cannot use LTE, because CSFB is not supported, the user terminal may neither select the corresponding cell nor disable the LTE function.

Figure 4:
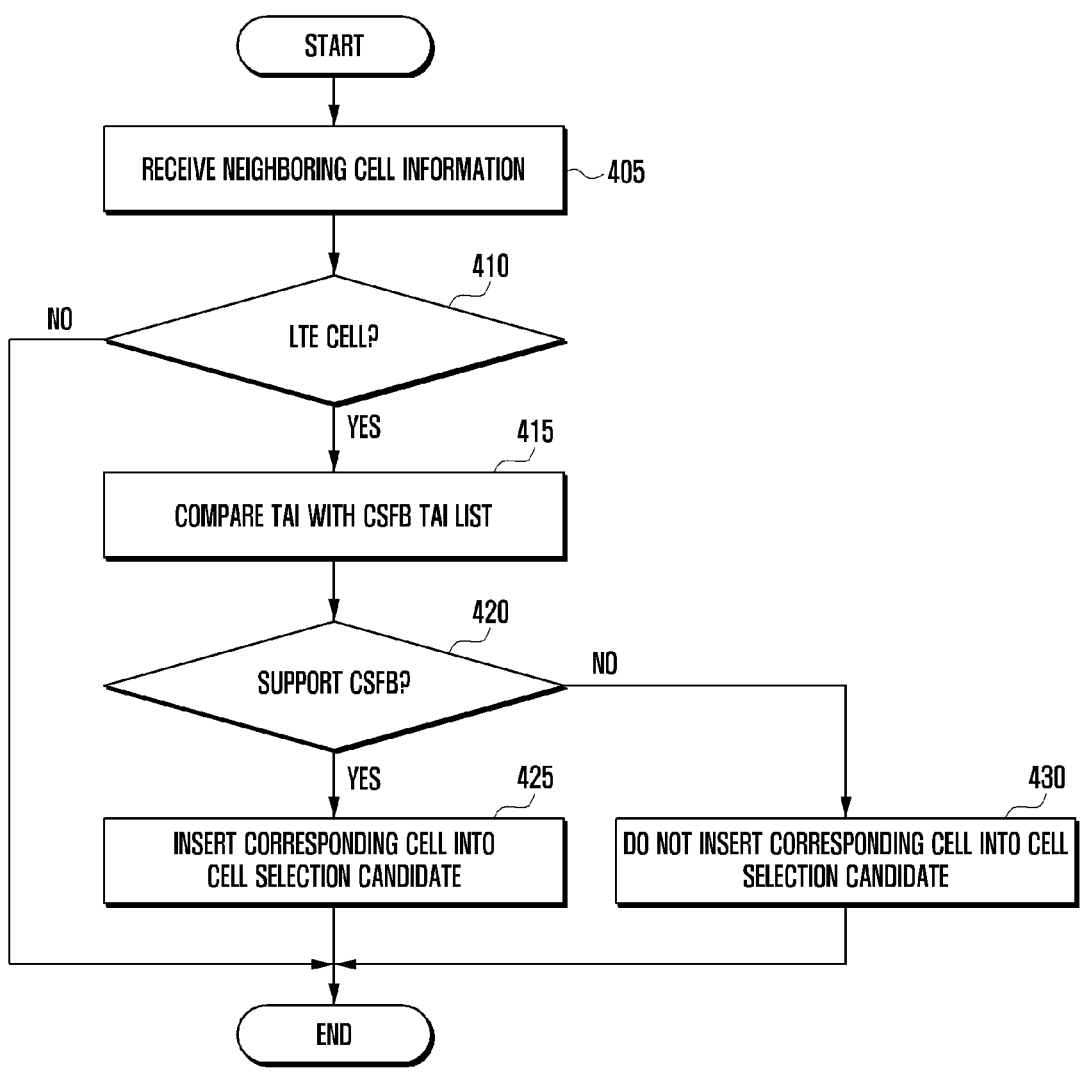
FIG. 4 is a flowchart illustrating an operation of a user terminal that determines whether an LTE cell supports CSFB based on a Tracking Area Identity (TAI) according to an embodiment of the present invention.

FIG. 4 is a flowchart illustrating an operation of a user terminal that determines whether an LTE cell supports CSFB based on a TAI according to an embodiment of the present invention.

Referring to FIG. 4, the user terminal receives neighboring cell information, for example, an SIB through a receiver in step 405. In step 410, a controller determines whether the corresponding cell is an LTE cell, based on the received cell information. When the cell is the LTE cell, the controller compares a TAI of the cell received through the receiver with a list of the configured TAIs in step 415. Through such a process, the controller may determine whether both an LTE service and a CS service can be received using the corresponding LTE cell in step 420.

When the controller determines that the corresponding LTE cell can be used, the controller considers that the corresponding cell can be selected/reselected in step 425. However, when the controller determines that the CS service will have a problem, because the corresponding LTE cell does not support CSFB, the controller does not consider the selection/reselection of the corresponding cell in step 430.

In FIG. 4, whether CSFB service is supported is identified through the TAI, and accordingly, the user terminal determines whether the LTE cell can be selected/reselected. However, according to another embodiment, the terminal may determine whether the CSFB service is supported using a TAI transmitted by an LTE cell and a TAI (list) configured in the terminal. When the CSFB service is not supported in a corresponding area, the terminal may prevent LTE from being selected, by locally giving a lower selection/reselection priority to the LTE cell over the 2G/3G cell. The selection/reselection priority may be generally configured through a reselection priority for each carrier frequency within IdleModeMobilityControlInfo of an RRCConnectionRelease message.

In the 2G/3G cell, the network may give a higher priority to LTE of the terminal connected to the network in order to urge the LTE cell to be selected. That is, the terminal selects the 2G/3G cell according to the configured priority in the LTE cell to access the network and then the access is released, a 2G/3G eNB may give a higher selection/reselection priority to the LTE cell over the 2G/3G cell through IdleModeMobilityControlInfo or similar information, thereby inducing the use of LTE rather than 2G/3G in the LTE cell supporting the CSFB service.

In accordance with another embodiment of the present invention, a mutual operation is used between the terminal and a core network. When a terminal desires to use CSFB and attempts to access an LTE network, the terminal performs a combined attach process or a combined TAU process. When the core network, which recognizes the process but does not support CSFB, informs the terminal that the CSFB service is not supported, the terminal stores information on the corresponding network, for example, a PLMN ID or a TAI, and also does not use LTE in the corresponding cell anymore.

Figure 5:
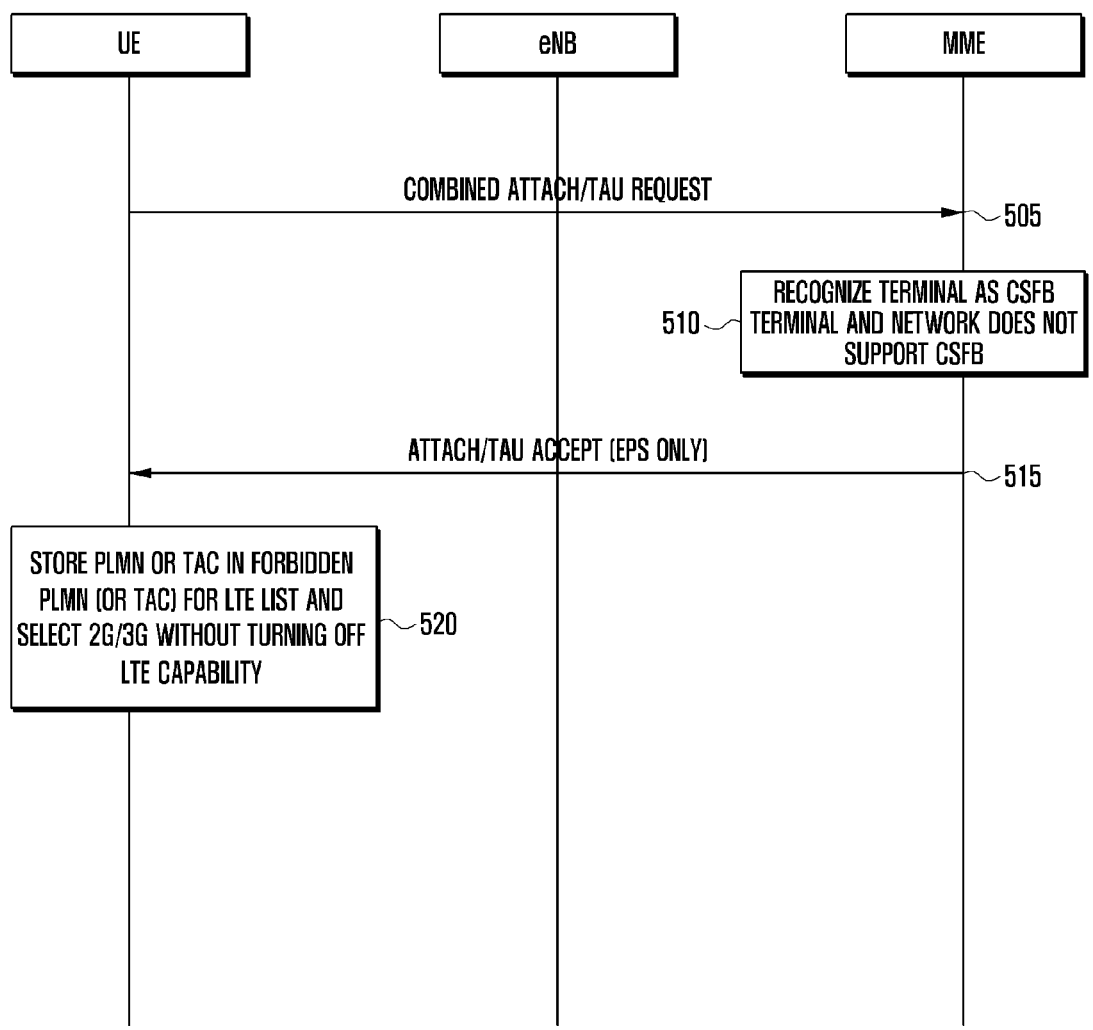
FIG. 5 is a signal flow diagram illustrating operations of a terminal and a network according to an embodiment of the present invention.

FIG. 5 is a signal flow diagram illustrating operations of a terminal and a network according to an embodiment of the present invention.

Referring to FIG. 5, the terminal (or a User Equipment (UE)) performs an attach or TAU process to access an LTE network, which has not been registered. When the CSFB service is used, the terminal performs a combined attach or combined TAU process. Accordingly, the terminal transmits a combined attach or combined TAU request message to the network in step 505. The request message of the terminal is transmitted to an MME of the core network.

The MME, after receiving the combined attach/TAU request message from the terminal, may recognize that the terminal desires to perform the CSFB service in step 510. However, when the network does not support CSFB, the MME informs the terminal that a result of the attach process corresponds to Evolved Packet System (EPS) only by transmitting an attach accept, or informs the terminal that the result corresponds to a TA updated by transmitting a TAU accept, thereby informing the terminal that a CS service has not been registered in step 515. Further, the MME may additionally transmit "#18, CS domain not available" to the terminal as a cause value or transmit a new cause to inform the user that the CSFB service cannot be used in the corresponding network (or area).

The terminal, after receiving the above-described information from the MME, may recognize the current LTE network does not support CSFB, even though the terminal should use CSFB service. In step 520, the terminal stores a PLMN ID of the network to which registration has been attempted in the list (for example, Forbidden PLMN list for LTE) and does not use LTE for the network having the PLMN ID included in the corresponding list. That is, when the cell information (for example, an SIB) received in the cell selecting/reselecting process indicates that the corresponding cell is an LTE cell and the PLMN ID included in the cell information is included in the list stored in the terminal, the terminal excludes the corresponding cell from being a selection/reselection candidate.

As described above, the terminal may use the TAI, instead of the PLMN ID, to determine whether the cell is selected/reselected. Specifically, when the terminal recognizes that the current LTE network does not support CSFB in FIG. 5, even though the terminal should use CSFB, the terminal stores the TAI of the network to which registration has been attempted in the list (for example, a Forbidden TAI list for LTE) and does not use LTE for the network having the TAI included in the corresponding list. That is, when the cell information (for example, an SIB) received in the cell selecting/reselecting process indicates that the corresponding cell is the LTE cell and the TAI included in the cell information is included in the list stored in the terminal, the terminal excludes the corresponding cell from being a selection/reselection candidate.

During such a process, the MME may additionally provide information on the LTE network that does not support CSFB, e.g., a list of PLMN IDs or a list of TAIs of another LTE network, which does not support CSFB. The information may be included in an attach accept message or a TAU accept message and the user terminal having received the message may determine that the CSFB service is not supported in the LTE cell having the PLMN (or TAI) included in the information.

When the user terminal performs the combined attach or combined TAU process in the network that does not support LTE, the MME may transmit an attach reject or TAU reject message to the user terminal instead of a response to a PS service to reject the registration in a modified form of the above described embodiment. In this case, the concept that the information is transmitted to and stored in the user terminal and then whether CSFB of the LTE network is supported is determined may be directly applied.

An operation using the PLMN ID or the TAI may be replaced with an operation in the network supporting CSFB with minor modifications. That is, when the user terminal attempts registration in the LTE network supporting CSFB, a core network node, such as the MME, may additionally transmit information of a PLMN ID or a TAI that the user should not use as LTE, by transmitting a registration accept message for the CSFB and LTE service. That is, a result of the registration corresponds to combined International mobile Subscriber Identity (IMSI)/EPS attach or combined IMSI/EPS updated, and a forbidden PLMN list for LTE or a forbidden TAI list for LTE is provided.

A terminal having received the result may simultaneously receive the LTE service and the CS service in the LTE network having completely registered. However, when the terminal moves to a network having a PLMN ID or a TAI that should not use LTE, since the PLMN ID or the TAI is included in the provided list, cells included in the corresponding network may be excluded from being a candidate for the cell selecting/reselecting process.

In the above-described embodiments, a core network informs a terminal whether a CSFB service is supported for PLMNs or TAIs in an attach/TAU process, and accordingly, the user terminal determines whether the LTE cell can be selected/reselected. However, according to another embodiment of the present invention, the terminal determines whether the CSFB service is supported based on information (PLMNs or TAIs) received from the core network. When the CSFB service is not supported in the corresponding area, the terminal may prevent LTE from being selected, by locally giving a lower selection/reselection priority to the LTE cell over the 2G/3G cell. The selection/reselection priority may be generally configured through a reselection priority for each carrier frequency within IdleModeMobilityControlInfo of an RRCConnectionRelease message.

In the 2G/3G cell, the network may give a higher priority to LTE of the terminal connected to the network in order to urge the LTE cell to be selected. That is, the terminal selects the 2G/3G cell according to the configured priority in the LTE cell to access the network and then the access is released, a 2G/3G eNB may give a higher selection/reselection priority to the LTE cell over the 2G/3G cell through IdleModeMobilityControlInfo or similar information, thereby inducing the use of LTE rather than 2G/3G in the LTE cell supporting the CSFB service.

In accordance with another embodiment of the present invention a Closed Subscriber Group (CSG) concept is utilized. More specifically, cells included in an LTE network supporting CSFB have predetermined CSG IDs. Further, a single radio LTE terminal supporting CSFB also has a CSG ID or a list of IDs indicating that the terminal is included in the LTE network supporting CSFB. The CSG ID or the list of IDs may be configured to be accepted only for a Home PLMN (HPLMN) or an Equivalent HPLMN (EHPLMN) of the terminal. Further, LTE cells supporting CSFB are configured as hybrid cells, and thus, a problem is not generated when a user terminal (for example, a dual radio LTE terminal) that does not have a CSG ID is used.

Accordingly, based on information received from the LTE cell, the single radio LTE terminal, based on CSFB, uses the corresponding cell when the CSG ID of the corresponding cell matches the list of CSG IDs included in the terminal. Because the LTE cell that does not support CSFB does not use the CSG ID, it is possible to prevent a connection of the single radio terminal. More specifically, an LTE cell supporting CSFB broadcasts a CSG ID but an LTE cell that does not support CSFB does not broadcast a CSG ID. Accordingly, the single radio CSFB LTE terminal may determine whether the LTE network supports CSFB by identifying whether a CSG ID configured in the terminal matches the CSG ID included in the LTE network.

Figure 6:
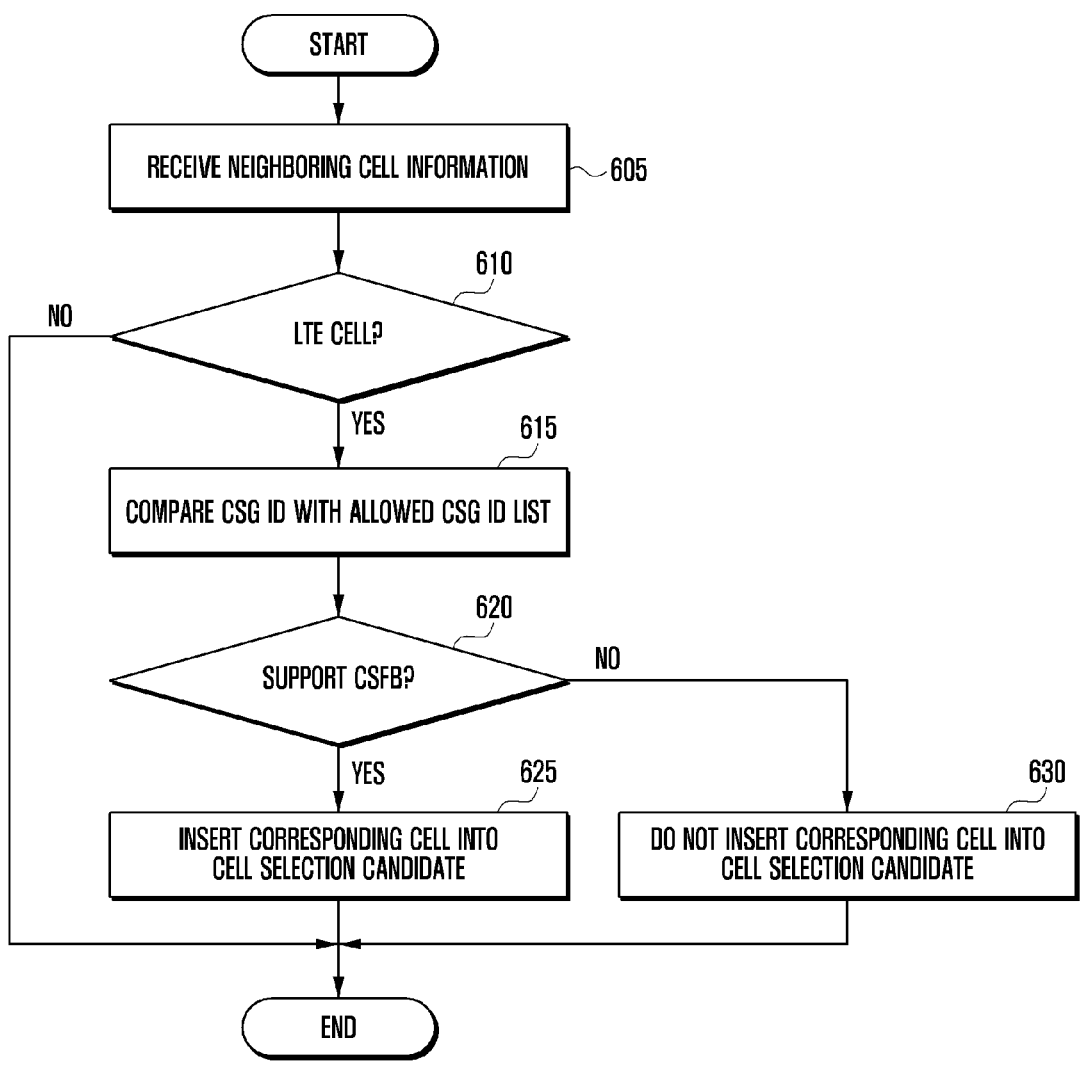
FIG. 6 is a flowchart illustrating a process of selecting/reselecting a cell by using a Closed Subscriber Group (CSG) concept according to an embodiment of the present invention.

FIG. 6 is a flowchart illustrating a process of selecting/reselecting a cell by using a CSG concept according to an embodiment of the present invention.

Referring to FIG. 6, a user terminal receives neighboring cell information, for example, an SIB, through a receiver in step 605. In step 610, a controller of the user terminal determines whether the corresponding cell is an LTE cell, using the received cell information. When the cell is the LTE cell, the controller compares a CSG ID (or CSG IDs) of the cell received through the receiver with a list of the configured CSG IDs in step 615. During such a process, the controller may determine whether both an LTE service and a CS service can be received using the corresponding LTE cell in step 620. When the controller determines that the corresponding LTE cell supports CSFB, and thus, can use LTE, the controller considers the corresponding cell as a selectable cell in step 625. However, when the controller determines that the CS service will have a problem due to the use of LTE, because the corresponding LTE cell does not support CSFB, the controller does not consider the selection of the corresponding cell in step 630. During such a process, the user terminal may determine that CSFB is not supported also when the CSG ID is not included in the received cell information.

An operation of determining whether LTE is used based on the CSG ID, as illustrated in FIG. 6, may also be restrictively applied to a particular PLMN. That is, a PLMN ID (or list of PLMN IDs), for which an operation of determining whether to select/reselect the LTE cell based on the CSG ID is performed, may be configured in the user terminal. For example, when a system is configured to perform the operation only for an HPLMN of the user terminal or an EHPLMN, the process of determining whether to select/reselect the cell based on the CSG ID is applied only when a PLMN of the network in which the user terminal is staying matches the HPLMN (or EHPLMN), and the process may be not applied to the other types of PLMNs.

As a modification of the above-described embodiments based on the CSG ID, cells included in an LTE network that do not support CSFB have predetermined CSG IDs. Further, a corresponding CSG ID or a list of IDs that does not support CSFB is also configured in the dual radio LTE terminal. The CSG ID or the list of IDs may be configured to be accepted only for the HPLMN or the EHPLMN. Further, the LTE cells that do not support CSFB are configured as closed cells, thereby preventing a connection of the user terminal (for example, single radio LTE terminal) that does not have the CSG ID.

In the LTE network that does not support CSFB, the dual radio LTE terminal may select and use the LTE network because a CSG ID included in cell information provided by the LTE cell matches the CSG ID included in the terminal. In contrast, the single radio LTE terminal based on CSFB may recognize whether the corresponding cell is the CSG cell according to information received from the LTE cell. However, because a matching CSG ID is not configured in the user terminal, the terminal cannot select/reselect the corresponding cell. Accordingly, through such a method, the dual radio LTE terminal may use the LTE network that does not support CSFB and the single radio LTE terminal based on CSFB may not use the LTE network.

In the above-described embodiments, whether CSFB service is supported is identified, and accordingly, whether the LTE cell can be selected/reselected is determined. However, according to another embodiment of the present invention, the terminal determines whether the CSFB service is supported using the CSG ID transmitted by the LTE cell and the CSG ID (list) configured in the terminal. When the CSFB service is not supported in the corresponding area, the terminal may prevent LTE from being selected, by locally giving a lower selection/reselection priority to the LTE cell over the 2G/3G cell. The selection/reselection priority may be generally configured through a reselection priority for each carrier frequency within IdleModeMobilityControlInfo of an RRC-ConnectionRelease message.

In the 2G/3G cell, the network may give a higher priority to LTE of the terminal connected to the network in order to urge the LTE cell to be selected. That is, the terminal selects the 2G/3G cell according to the configured priority in the LTE cell to access the network and then the access is released, a 2G/3G eNB may give a higher selection/reselection priority to the LTE cell over the 2G/3G cell through IdleModeMobilityControlInfo or similar information, thereby inducing the use of LTE rather than 2G/3G in the LTE cell supporting the CSFB service.

In accordance with another embodiment of the present invention information as to whether the corresponding cell supports CSFB is included in cell information. Specifically, cells included in an LTE network that do not support CSFB insert information informing that CSFB cannot be used into cell information (for example, an SIB), and transmit the cell information. When CSFB is supported, based on the information received from the LTE cell (that is, information indicating that CSFB is not supported is not transmitted), the single radio LTE terminal based on CSFB determines that the corresponding cell can be used and considers the corresponding cell as a selection/reselection candidate.

More specifically, a method may be implemented by using information in the conventional cell information. For example, an LTE cell that does not support CSFB informs user terminals of information indicating that CSFB cannot be used, using ac-BarringForCSFB existing in SIB type 2, and the single radio LTE terminal having received this information may recognize that CSFB is not supported and that the corresponding cell should not be used in the cell selecting/reselecting process.

Detailed values (for example, values of ac-BarringFactor and ac-BarringTime) included in ac-BarringForCSFB used to indicate that CSFB cannot be used should be the same as values pre-configured in the user terminal. For example, an LTE cell that does not support CSFB configures a value of an ac-BarringFactor within ac-BarringForCSFB as p95 and informs the terminal that CSFB cannot be used in the corresponding cell. Further, information according to a value of the parameter is pre-configured in the user terminal, such that a processing of selecting/reselecting the corresponding LTE cell may not be performed through reception of the information.

Similar to the embodiments of the present invention described above, an operation of determining whether to use LTE based on Access Class Barring information may be restrictively applied to a particular PLMN. That is, a PLMN ID (or list of PLMN IDs), for which an operation of determining whether to select/reselect the LTE cell based on the Access Class Barring information is performed, may be configured in the user terminal. For example, when a system is configured to perform the operation only for an HPLMN of the user terminal or an EHPLMN, the process of determining whether to select/reselect the cell based on the Access Class Barring information is applied only when a PLMN of the network in which the user terminal is staying matches the HPLMN (or EHPLMN) and the process may be not applied to the other types of PLMNs.

Alternatively, an identifier may be added to indicate whether new CSFB is supported in the cell information. For example, LTE cells may insert a new identifier, such as CSFB-Supported, into SIB type 1 or SIB type 2, where the identifier is used to inform the user terminal that CSFB is supported or is not supported (e.g., when CSFBSupported is used, 0 may indicate that CSFB is not supported and 1 may indicate that CSFB is supported). The user terminal, after receiving an explicit identifier indicating whether CSFB is supported from the LTE cell, may recognize whether CSFB is supported, and the single radio CSFB LTE terminal does not consider a connection of the LTE network that does not support CSFB.

Alternatively, a particular field of SIB type 8, which can be transmitted by the LTE cell, may be used. For example, SIB type 8 transmitted by the LTE cell is used to provide information on a CDMA 2000 network around the LTE network. Accordingly, csfb-DualRxTxSupport of csfb-SupportForDualRxUEs of indicators of SIG type 8 may inform the user terminal as to whether CSFB is supported or not (e.g., in the two indicators, TRUE or 1 may indicate that CSFB is supported or FALSE or 0 may indicate that CSFB is supported).

In general, when the CDMA 2000 network does not exist around the LTE network, the LTE eNB does not transmit SIB type 8 and the terminal that does not need a connection of the CDMA 2000 network is not required to hear SIB type 8. However, in accordance with an embodiment of the present invention, when the CDMA 2000 network does not exist, the eNB may inform that the LTE cell supports CSFB through a particular identifier included in SIB type 8. The user terminal having received an explicit identifier indicating whether CSFB is supported from the LTE cell may then recognize whether CSFB is supported, and the single radio CSFB LTE terminal does not consider a connection of an LTE network that does not support CSFB.

As described above, receiving and analyzing SIB type 8 to recognize whether CSFB is supported, rather than accessing the CDMA 2000 network, may be restrictively applied to the single radio CSFB LTE terminal. Particularly, such an operation may be generated only when the cell is included in a particular area (PLMN or TAI).

Figure 7:
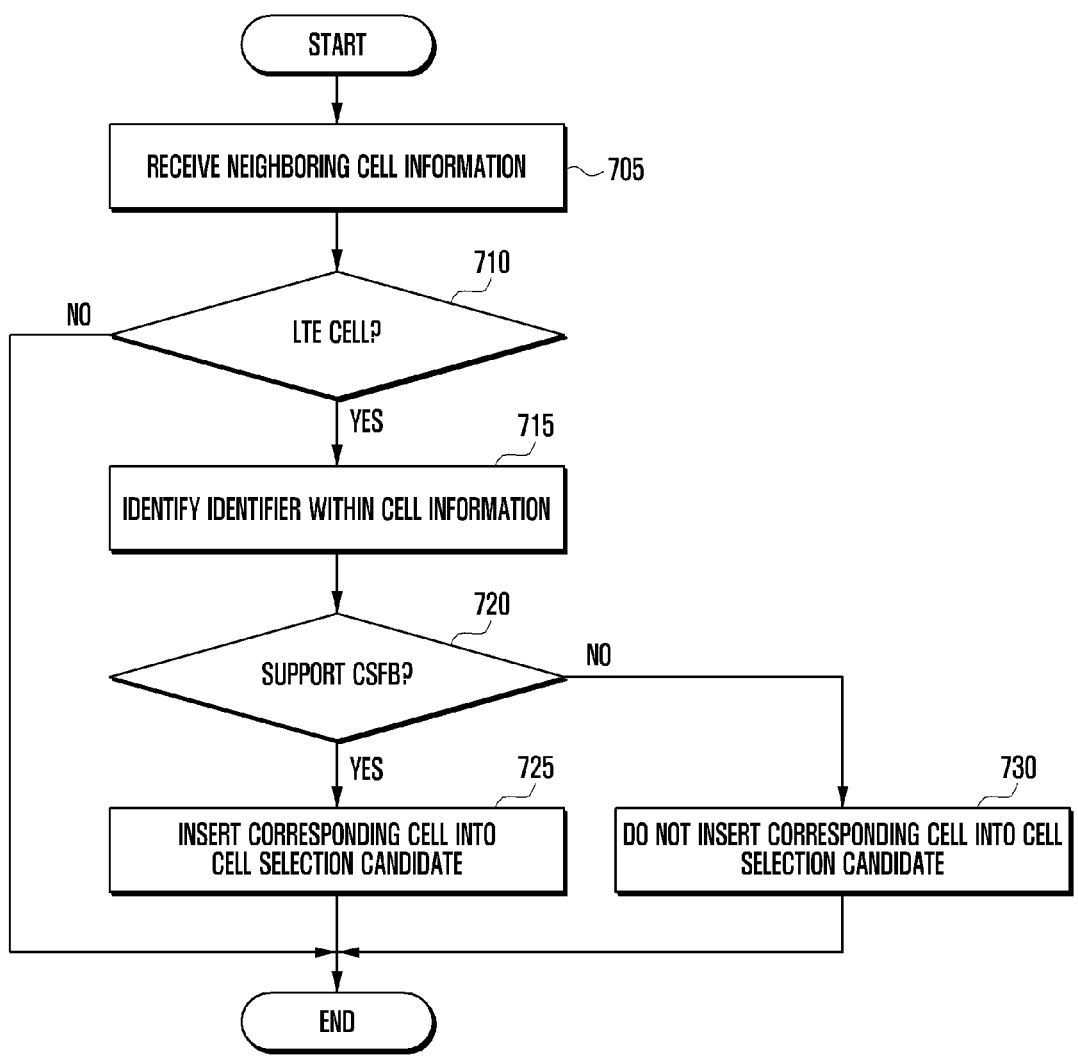
FIG. 7 is a flowchart illustrating an operation of a terminal according to an embodiment of the present invention.

FIG. 7 is a flowchart illustrating an operation of a terminal according to an embodiment of the present invention.

Referring to FIG. 7, the terminal receives neighboring cell information, for example, an SIB, through a receiver in step 705. In step 710, a controller of the terminal determines whether the corresponding cell is an LTE cell, based on the received cell information. Further, the controller may identify whether a cell can be selected according to an identifier indicating whether CSFB is supported.

When it is determined that the corresponding cell is the LTE cell using cell information, the terminal identifies an identifier of the cell information in step 715. As described above, the identifier may be an identifier included in conventional SIB or a newly defined identifier. The terminal identifies whether the corresponding LTE cell supports CSFB using a value of the identifier in step 720. When CSFB is supported, the terminal inserts the corresponding cell into a cell selection candidate in step 725. However, when CSFB is not supported, the terminal excludes the corresponding LTE cell from the cell selection candidate in step 730.

In the above-described embodiments, whether the CSFB service is supported is informed through the Access Class Barring information or the SIB, and accordingly, whether the LTE cell can be selected/reselected is determined. However, according to another embodiment of the present invention, the terminal determines whether the CSFB service is supported through the identifier transmitted by the LTE cell. When the CSFB service is not supported in the corresponding area, the terminal may prevent LTE from being selected, by locally giving a lower selection/reselection priority to the LTE cell over the 2G/3G cell. The selection/reselection priority may be generally configured through a reselection priority for each carrier frequency within IdleModeMobilityControlInfo of an RRCConnectionRelease message.

In a 2G/3G cell, the network may give a higher priority to LTE of the terminal connected to the network in order to urge the LTE cell to be selected. That is, the terminal selects the 2G/3G cell according to the configured priority in the LTE cell to access the network and then the access is released. A 2G/3G eNB may give a higher selection/reselection priority to the LTE cell over the 2G/3G cell through IdleModeMobilityControlInfo or similar information, thereby inducing the use of LTE rather than 2G/3G in the LTE cell supporting the CSFB service.

In accordance with another embodiment of the present invention, a user terminal informs an eNB of an identifier indicating that the user terminal itself is the LTE terminal supporting CSFB, and the eNB determines whether CSFB can be used in consideration of whether the received identifier or neighboring LTE cells support CSFB. When CSFB can be used, the eNB may give a higher priority to LTE over 2G/3G. Otherwise, the eNB may give a lower priority to LTE.

More specifically, when the user selects the LTE cell to attempt access, the user may include an identifier indicating that CSFB is supported. An example of the identifier, csfb_supported, may be inserted into an RRC message, or a particular value indicating whether CSFB is supported may be used for a Feature Group Indicator.

When LTE cells can support CSFB, the LTE eNB, which has received an access request including the identifier from the terminal, may give a relatively higher priority to LTE when configuring reselection priorities of LTE/2G/3G frequencies of the terminal. In contrast, when LTE cells cannot support CSFB, the LTE eNB may give a relatively lower priority to LTE when configuring reselection priorities of LTE/2G/3G frequencies of the terminal. The terminal may not turn off the LTE function (E-UTRAN capability) even though the terminal receives information indicating that registration of the CS service has failed from the core network.

Also, when the terminal selects the 2G/3G cell to attempt an access, the terminal may insert an identifier indicating whether CSFB is supported. An example of the identifier, csfb_supported, may be inserted into an RRC message, or a particular value indicating whether CSFB is supported may be used for a Feature Group Indicator.

When neighboring LTE cells can support CSFB, the 2G/3G eNB, which has received an access request including the identifier from the terminal, may give a relatively higher priority to LTE when configuring reselection priorities of LTE/2G/3G frequencies of the terminal. In contrast, when neighboring LTE cells cannot support CSFB, the 2G/3G eNB may give a relatively lower priority to LTE when configuring reselection priorities of LTE/2G/3G frequencies of the terminal.

Figure 8:
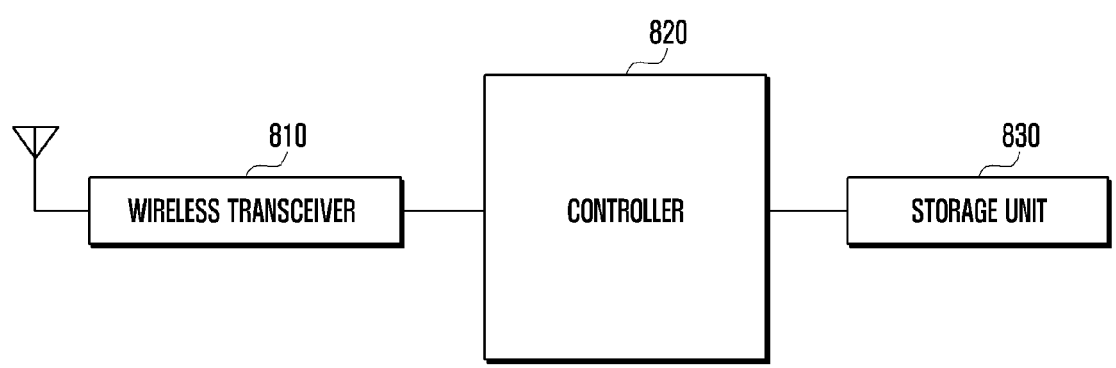
FIG. 8 is a block diagram illustrating a terminal according to an embodiment of the present invention.

FIG. 8 is a block diagram illustrating a configuration of a terminal according to an embodiment of the present invention.

Referring to FIG. 8, the terminal includes a wireless transceiver 810, a controller 820, and a storage unit 830. Examples of the storage unit 830 include a Read Only Memory (ROM) device, a Random Access Memory (RAM) device, and other direct-access data storage media.

The wireless transceiver 810 receives cell information from the network and transmits a registration related message according to a control of the controller 820. The controller 820 determines whether the current LTE cell support CSFB through cell information according to the above described embodiments of the present invention and determines whether to select a cell according to a result of the determination. Various pieces of information used for the operation of the terminal according to the different embodiments of the present invention may be stored in the storage unit 830. For example, a PLMN ID or a TAI list configured according to whether CSFB is supported may be stored.

Figure 9:
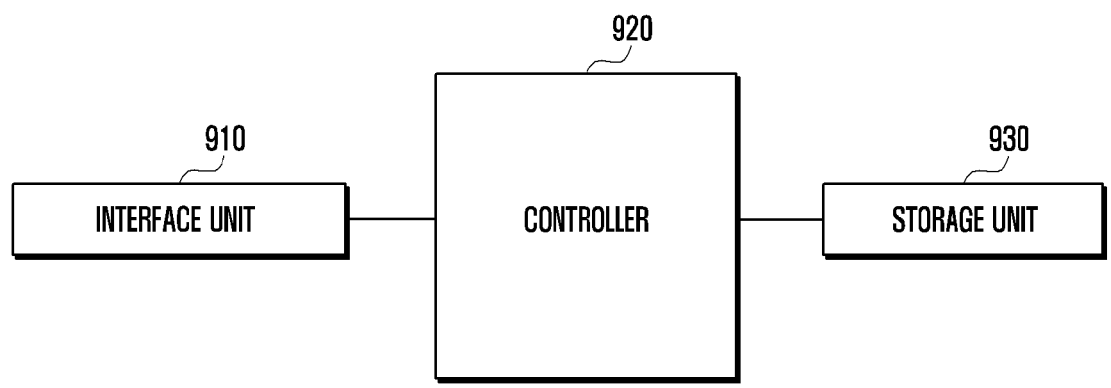
FIG. 9 is a block diagram illustrating an MME according to an embodiment of the present invention.

FIG. 9 is a block diagram illustrating a configuration of an MME according to an embodiment of the present invention.

Referring to FIG. 9, the MME includes an interface unit 910, a controller 920, and a storage unit 930. Examples of the storage unit 940 include a Read Only Memory (ROM) device, a Random Access Memory (RAM) device, and other direct-access data storage media.

The interface unit 910 is connected to the eNB and transmits/receives a message to be transmitted to the terminal and a message transmitted from the terminal. The controller 920 configures a message to be transmitted to the terminal in connection with the above-described embodiments of the present invention. Various types of information used for the operation of the MME according to the different embodiments of the present invention may be stored in the storage unit 930. For example, PLMN IDs or TAI information differently configured according to whether the LTE cell supports CSFB may be stored.

When the terminal moves, after a Packet Data Network (PDN) connection is generated in a local network, how to process the PDN connection is also an important issue. The present invention is based on architecture in which gateways including co-located Serving GateWay (SGW) and Local GateWay (LGW) close to eNBs configure one local network. When the terminal accesses using eNBs within one local network, using a local SGW/LGW within the local network makes an efficient data path.

Accordingly, when the terminal moves to an area of local network 2 from an area of local network 1, a PDN connection that has been made using a local LGW of local network 1 is released, a local SGW of local network 1 is re-located to a local SGW of local network 2, and then the terminal should be informed of a cause of the released PDN connection so that the terminal can make a request for the PDN connection again.

However, a problem occurs when the terminal moves to two different local networks in a connected mode, because the MME cannot know the movement of the local networks during a handover process thereof. Particularly, when SGWs/LGWs and (H)eNBs in two different local networks are connected to each other, even though the terminal moves to local network 2 from local network 1, an efficient data path may be generated because an actual data path is formed, such that the SGW/LGW of local network 1 is connected to (H)eNBs of local network 2.

In order to address the above-described problem, the MME should know that the terminal has moved to another local network. Particularly, when two different local networks exist within one TA or two local networks exist within TAs corresponding to the TA list of the terminal, the terminal does not perform a TAU, regardless of an idle state or a connected state, such that the MME, which is a mobility management controller of the terminal, cannot know that the terminal has moved to another local network. That is, because there is no message transmitted by the terminal in the handover process, the MME cannot determine whether the terminal has moved between local networks. Also, because there is no message transmitted by the terminal when the terminal is in the idle state, the MME cannot determine whether the terminal has moved between local networks.

Accordingly, among the conditions, when the terminal moves to another local network in the idle state, the terminal transmits a service request message informing that the terminal enters an active state. When the eNB transmits the service request message to the MME, the eNB also transmits a current local network ID to the MME. Thereafter, the MME determines whether to release PDN connections using the local LGW with reference to the local network ID during a procedure of processing the service request message. When the PDN connections are to be released, the MME first releases a bearer-related context before a setup, performs a re-location of changing the SGW to a closer SGW as necessary, and requests the setup of the bearer, except to the content related to the released PDN connection, to the eNB for a service request process.

Further, when the terminal moves in the connected state, a state of the terminal is similarly changed to the idle state after the terminal has performed the handover process. In order to switch back the idle state to the connected state, an operation of releasing the PDN connection using another local network LGW by using local network ID information and re-locating the SGW is performed when the service request process is performed.

In another implementation example, which can be performed while the terminal moves in the connected state, i.e., during the handover process, information on a local network including a target eNB is inserted into a handover request ACK message of the Si handover or a path switch request message of X2 handover that the target eNB transmits to the MME during the handover process, and the MME, having received the message, temporarily stores the message until the handover process is completed. Thereafter, the MME determines whether to release PDN connections using the local LGW, based on the temporarily stored information on the local network including the target eNB, and then performs the re-location of the SGW to the closer SGW as necessary.

Figure 10:
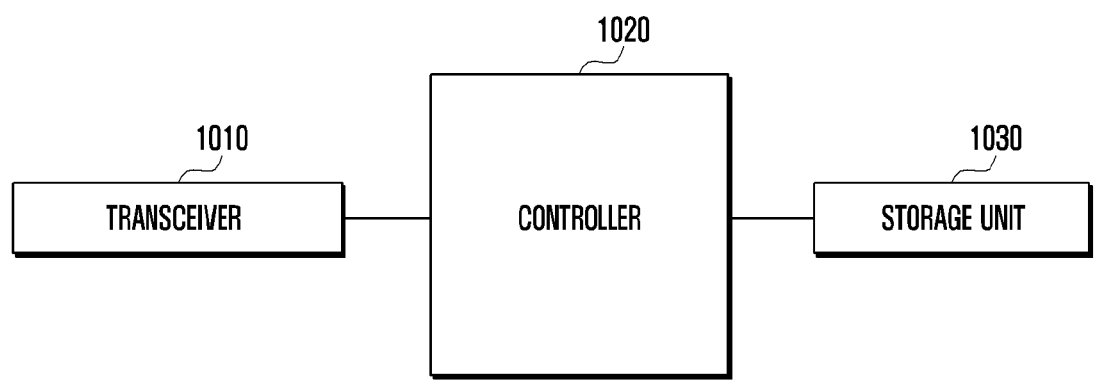
FIG. 10 is a block diagram illustrating an eNB according to an embodiment of the present invention.

FIG. 10 is a block diagram illustrating a configuration of an eNB according to an embodiment of the present invention.

Referring to FIG. 10, the eNB includes a transceiver 1010, a controller 1020, and a storage unit 1030.

The transceiver 1010 includes a wire transceiver and a wireless transceiver. A wire transceiver is connected to the MME and transmits/receives a message to be transmitted to the terminal and a message transmitted from the terminal. The wireless transceiver 1010 transmits cell information to the terminal and transmits/receives a cell selection related message according to a control of the controller 1020.

According to the above-described methods and apparatuses for supporting cell selection in a mobile communication network, according to embodiments of the present invention, the controller 1020 controls for transmitting a message, which includes information indicating whether a cell of eNB, which the terminal accesses, supports CSFB. Various types of information may be used for the operation of the eNB stored in the storage unit 1030 according to the different embodiments of the present invention.

In the above-described embodiments, all steps may be selectively performed or may be omitted. Further, steps in each embodiment do not have to be sequentially performed and orders thereof may be changed.

Performing the combined attach process of a terminal includes that the terminal configures an EPS attach type IE of an attach request message as a combined EPS/IMSI attach and transmits the attach type IE to an eNB. Similarly, Performing the combined TAU process of a terminal includes that the terminal configures an EPS update type IE of a TAU request as a combined TA/LA updating with IMSI attach and transmits the attach type IE to an eNB.

According to the above-described methods and apparatuses for selecting a cell in a mobile communication network according to embodiments of the present invention, a terminal determines whether to select a corresponding cell according to whether a network, in which a legacy system and an LTE system overlap, supports CSFB, thereby using both a PS service and a CS service without stopping an LTE function.

While the various embodiments of the present invention shown and described in this specification and the drawings correspond to specific examples presented in order to easily explain technical contents of the present invention, and to help comprehension of the present invention, but are not intended to limit the scope of the present invention, it is obvious to those skilled in the art to which the present invention belongs that different modifications can be achieved based on the technical spirit of the present invention. Accordingly, it will be understood by those of ordinary skill in the art that various changes in form and details may be made therein without departing from the spirit and scope of the present invention as defined by the following claims and their equivalents.

What is claimed is:

1. A method of cell selection by a terminal in a mobile communication system, the method comprising:
    transmitting, to a first network, an attach request message including information indicating that the terminal supports a packet switched (PS) service and a circuit switch (CS) service;
    receiving a first message from the first network;
    determining whether a first cell of the first network supports circuit switched fallback (CSFB), based on the first message; and
    selecting a second cell of a second network and adding an indication of the first cell to a list of indications of cells that do not support CSFB, if the terminal determines that the CSFB is not supported by the first cell,
    wherein the list is stored in the terminal and used by the terminal for cell selection.

2. The method of claim 1, wherein the first message includes at least one of an attach accept message or a tracking area update (TAU) accept message transmitted from a mobility management entity (MME) of the network, and
    wherein the at least one of the attach accept message or the TAU accept message includes an identifier indicating whether the CSFB can be used.

3. The method of claim 1, wherein selecting the second cell comprises not disabling a long term evolution (LTE) function of the terminal.

4. The method of claim 1, wherein selecting the second cell comprises changing a cell selection priority based on whether the CSFB is supported.

5. The method of the claim 1, wherein the first network includes a 4th generation (4G) network, and
    wherein the 4G network includes a long term evolution (LTE) system.

6. The method of the claim 1, wherein the second network includes at least one of a 2nd generation (2G) network or a 3rd generation (3G) network.

7. The method of claim 1, further comprising:
    transmitting an attach request message to a third network;
    receiving, from the third network, at least one of a master information block (MIB) or a system information block (SIB) including an indication of a third cell of the third network; and
    determining whether to select the third cell of the third network by comparing the indication of the third cell from the at least one of the MIB or the SIB with the indications included in the list.

8. A terminal for cell selection in a mobile communication system, the terminal comprising:
    a transceiver configured to transmit and receive a signal; and
    a controller configured to:
        transmit, to a first network, an attach request message including information indicating that the terminal supports a packet switched (PS) service and a circuit switch (CS) service,
        receive a first message from the first network, to determine whether a first cell of the first network supports circuit switched fallback (CSFB), based on the first message, and
        select a second cell of a second network and add an indication of the first cell to a list of indications of cells that do not support CSFB, if the terminal determines that the CSFB is not supported by the first cell,
        wherein the list is stored in the terminal and used by the terminal for cell selection.

9. The terminal of claim 8, wherein the first message includes at least one of an attach accept message or a tracking area update (TAU) accept message transmitted from a mobility management entity (MME) of the network, and
    wherein the at least one of the attach accept message or the TAU accept message includes an identifier indicating whether the CSFB can be used.

10. The terminal of claim 8, wherein the controller is further configured to determine not to disable a long term evolution (LTE) function of the terminal, if the terminal selects the second cell.

11. The terminal of claim 8, wherein the controller is further configured to change a cell selection priority based on whether the CSFB is supported.

12. The terminal of the claim 8, wherein the first network comprises a 4th generation (4G) network, and
   wherein the 4G network comprises a long term evolution (LTE) system.

13. The terminal of the claim 8, wherein the second network comprises at least one of a 2nd generation (2G) network or a 3rd generation (3G) network.

14. The terminal of the claim 8, wherein the controller is further configured to:
   transmit an attach request message to a third network,
   receive at least one of a master information block (MIB) or a system information block (SIB) including an indication of a third cell of the third network from the third network, and
   determine whether to select the third cell of the third network by comparing the indication of the third cell from the at least one of the MIB or the SIB with the indications included in the list.

\* \* \* \* \*